March 25, 1958  G. A. GUCKEL  2,827,928
FILLING APPARATUS
Filed Oct. 11, 1954  3 Sheets-Sheet 1
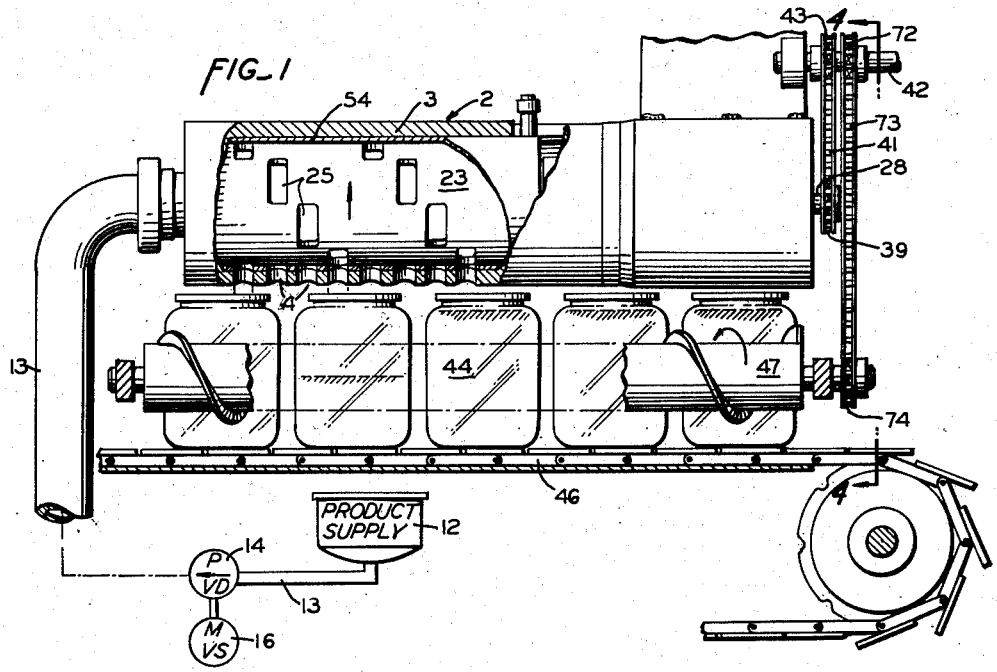
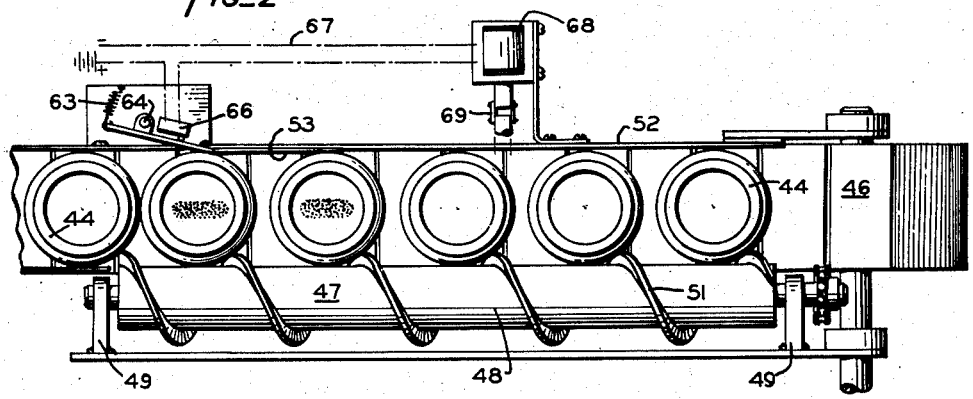
INVENTOR.
GERHART A. GUCKEL
BY
ATTORNEYS March 25, 1958 G. A. GUCKEL 2,827,928
FILLING APPARATUS
Filed Oct. 11, 1954 3 Sheets-Sheet 2
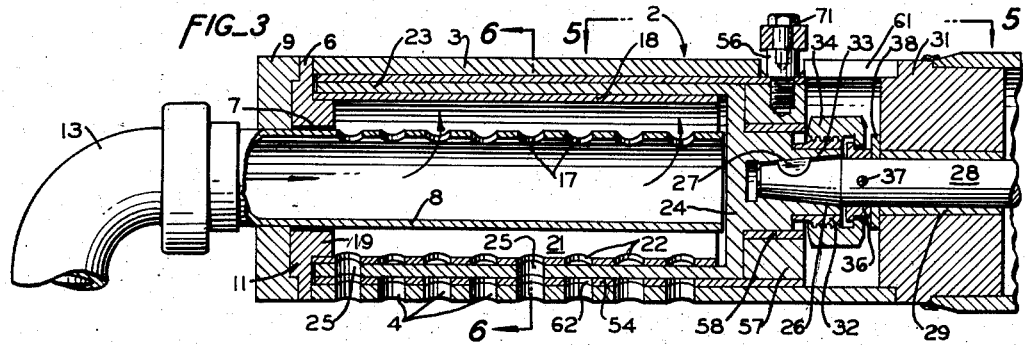
INVENTOR.
GERHART A. GUCKEL
BY
ATTORNEYS

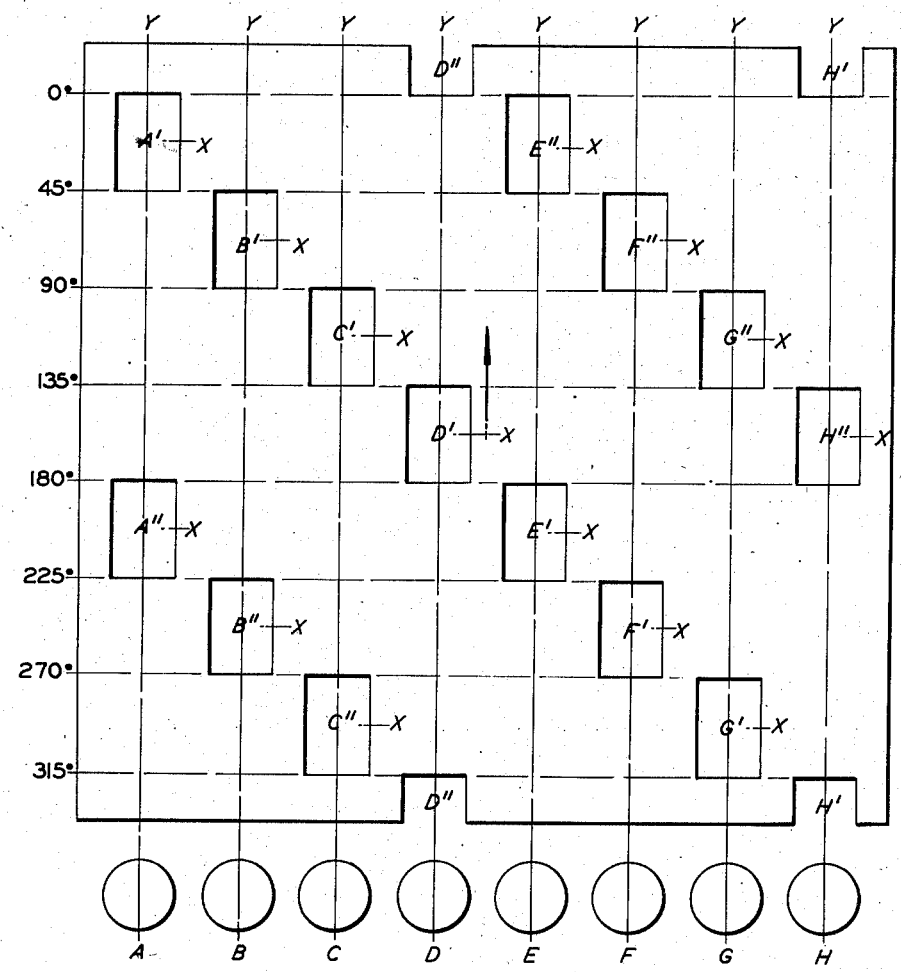

United States Patent Office 2,827,928
Patented Mar. 25, 1958

2,827,928
FILLING APPARATUS

Gerhart A. Guckel, Los Altos, Calif., assignor to James Dole Engineering Co., San Francisco, Calif., a corporation of Nevada Application October 11, 1954, Serial No. 461,457

12 Claims. (Cl. 141—134)

This invention relates to the continuous filling of a product in containers, and more particularly to an improved apparatus and method for the continuous filling without spillage of containers positioned with their mouths spaced apart.

In assignee's prior Patent No. 2,667,424, dated January 26, 1954, a continuous filler is disclosed wherein containers with their flanges overlapped are conveyed in one general direction past a continuous stream of the product with a continuous substantially uninterrupted motion whereby the containers are uniformally filled. In order to accomplish continuous uniform filling, with substantially no spillage in those situations where the mouths of the containers to be filled could not be suitably positioned in adjacent contacting relationship, a filler structure was provided in accordance with assignee's Patent No. 2,631,768, dated March 17, 1953.

The filler of the latter patent provides continuously moving spaced branch streams of the filler product by means of a helical passage in a valve member, thus permitting spaced containers positioned underneath branch streams to be uniformly filled in their travel past the filler. Although such filler accomplishes its purpose of filling spaced containers, a whipping action is created in each continuously moving branch stream under relatively high speed operation of the filler by virtue of the inertia effect imposed on the individual streams by the moving helical passage. This whipping effect at relatively high speeds results in spillage.

The present invention provides an apparatus and method which permit the continuous and uniform filling of containers positioned with their mouths spaced apart, as well as containers having overlapped flanges, with substantially no spillage, eliminating the aforementioned undesirable whipping action at relatively high speeds.

The present invention further provides an accurate discharge of a filler product comprised of discrete particles, as well as a liquiform filler product comprised of an homogeneous liquid, and provides an efficient means for regulating the velocity of the filler product at various discharge points along the filler in accordance with the viscosity of the particular product used. The filler product can be any of the usual food products filled in containers such as metal cans and glass jars. For example purees, baby foods, milk, and soups can be the filler product. However, the filler can be used for non-food products such as lotions and lubricating oils.

More particularly the present invention provides a method of filling a product in containers comprising introducing a substantially continuous stream of the product to a filler zone, continuously conveying a line of containers past the filler zone and discharging the product from the filler zone into the conveyors from spaced discharge points along the filler zone for intermittent time periods from each point regulated in accordance with the movement of the containers with respect to each of said discharge points.

In order to carry out this method, the present invention further provides an apparatus comprising an elongated filler having discharge means disposed along the length of the filler, rotary means for supplying a product through the discharge means in intermittent separate bodily fixed streams at spaced intervals along the length of the filler and which are immovable in a longitudinal direction with respect to the filler, and means for continuously conveying the containers past the filler in timed relation with the rotary supplying means.

Various other features of the present invention will become obvious from a reading of the disclosure set forth herein.

Referring to the drawings which disclose one advantageous embodiment of the invention:

Fig. 1 is a more or less schematic longitudinal sectional elevation of a portion of the filler conveyor and feeder apparatus, with parts of the cylindrical shutoff valve shown broken away to illustrate the invention more clearly;

Fig. 2 is a fragmentary plan view of Fig. 1; the filler unit being omitted from the view for purposes of clarity;

Fig. 3 is an enlarged longitudinal vertical sectional view through the filler unit, illustrating details of construction;

Fig. 4 is an end elevation view taken in a plane indicated by the line 4—4 in Fig. 1;

Fig. 5 is a fragmentary plan view of the filler unit taken in a plane indicated by the line 5—5 in Fig. 3;

Fig. 6 is a cross-sectional view of the filler unit taken in a plane indicated by the line 6—6 in Fig. 3, the cylindrical shut-off valve being in "open" position to permit filling operation;

Fig. 7 is a cross-sectional view like that of Fig. 6, the cylindrical shut-off valve being in "closed" position to prevent filling operations;

Fig. 8 is a schematic developed view of the cylindrical rotor valve, and its relation to the discharge ports of the filler unit in which it is disposed.

As can be seen with particular reference to Figs. 1 and 3, the filler unit comprises a substantially cylindrical elongated filler casing 2. This casing is formed of a tubular body portion 3 having discharge means which in the instant disclosure is in the form of a plurality of spaced apart discharge ports 4 longitudinally disposed in a row in its lower part. As can be seen in Fig. 3, positioned at one end of body 3 is an end facing plate 6, having a passage 7 centrally disposed therethrough. Projecting through this passage is a fixed product inlet and distributor conduit 8. The conduit 8 has an end seal plate 9 fixed to and surrounding its outer wall, the plate being adapted to mate with an outer shoulder 11 of the end facing plate 6 to seal off one end of the casing.

With reference to Fig. 1, conduit 8 is connected to a product supply tank 12 by conduit 13. Connected in conduit 13 is a so-called constant volumetric discharge pump 14 which provides means for supplying a fixed predetermined quantity or volume of the product per unit of time; this quantity being regulatable at will by means of variable speed motor 16 connected to drive the pump.

Referring to Fig. 3, the product is introduced into the filler by distributor conduit 8, being discharged into the filler casing through a discharge means which in the instant disclosure is in the form of a plurality of distributor ports 17 longitudinally spaced along the upper part of conduit 8.

By arranging distributor ports 17 in the upper part of conduit 8, it is possible to effect a desirable air removal in the filler casing and to obtain an even distribution of the product over the entire length of the filler casing. Distributor ports 17 are advantageously arranged to coincide in number with the row of discharge ports 4, and are positioned in alignment with ports 4. However, it is to be understood, that the number and arrangements of the distributor ports 17 and the discharge ports 4 can be varied in accordance with the results desired.

In order to prevent the filler product from being rotated by the motion of a cylindrical rotor valve 23, hereinafter described in greater detail, a cylindrical shield sleeve 18 (Fig. 3) is fixedly positioned around conduit 8, one end of the sleeve being mounted on an inner shoulder 19 of end facing 6. The inner diameter of this sleeve 18 is substantially greater than the outer diameter of distributor conduit 8 so as to form an annular chamber 21 therebetween. In operation, the product passes from ports 17 into and through this chamber 21 by way of shield ports 22 disposed along the lower part of shield 18 and which, like ports 17, are arranged to coincide in number with and to be in alignment with the row of ports 4. It is to be understood that the number and arrangement of these ports can be varied in accordance with the number and arrangement of discharge ports 4.

To control the discharge of the product from the filler casing along spaced discharge ports 4, a rotary valve member in the form of a cylindrical rotor valve 23 surrounds cylindrical shield sleeve 18. Valve 23 terminates in an end hub portion 24 which serves to seal off the annular chamber 21. This hub 24 is further provided with a tapered bore 26 and key-fitted in this bore by key 27 is the mating tapered drive shaft 28. Shaft 28, in turn, is journaled in a bearing liner 29 which is supported by bearing block 31, the bearing block forming part of casing 2. To maintain the shaft in lineal engagement with hub 24 of the rotor valve, an externally threaded collar 32 is fitted on a reduced portion 33 of the hub. Engaging this collar is internally threaded gripping nut 34 which is arranged to grip a collar 36 fixed to shaft 28 by pin 37. A thrust washer 38 is positioned between collar 36 and bearing block 29 to accommodate any lineal thrust which might occur during operation.

In order to drive the shaft 28 and thus rotate the rotor valve 23, any suitable driving means can be employed. A form of drive comprises a sprocket 39 (Fig. 4) positioned on the shaft. This sprocket is driven by chain drive 41. Referring to Figs. 1 and 4, it can be seen that chain drive 41 is, in turn, driven by a main drive shaft 42 through a sprocket 43 carried on the main shaft.

As can be seen in Figs. 1, 3 and 8, the cylindrical rotor valve is provided with passage means in the form of a plurality of individual angularly offset control ports 25 disposed along the wall; the portions of rotor valve 23 between control ports 25 therein also forming angularly offset sealing parts for the discharge ports 4 except when such discharge ports 4 are uncovered by control ports 25 as the rotor 23 rotates. When the rotor valve is rotated by driving the shaft 28, the ports 25 in the rotor valve cooperate with the row of discharge ports 4, moving transversely in a plane substantially at a right angle to the row so as to supply the product through said discharge ports in intermittent individual sequential or in other words successive streams at spaced intervals along the length of filler casing 2. In this regard it should be noted that the streams do not move axially along the length of the filler.

Although Fig. 8 is a development for the specific rotor valve disclosed in Figs. 1 and 3, the particular operation of which is described hereinafter, it is to be understood that various other arrangements of the rotor valve ports can be made in accordance with the results desired. In fact, by varying the arrangement of the rotor valve ports, discharge ports, the speed of the conveyor and the quantity of product feed per unit of time, each with respect to the other, an unlimited number of different filling sequences can be accomplished without spillage of the product even though the containers are spaced apart. Furthermore, by varying the cross sectional area of the ports with respect to each other, particularly the ports of the rotor valve, since this valve is more readily adaptable to such variation, it is possible to control the velocity of flow in accordance with the viscosity of the product used. This in turn permits the minimizing of splashing, and a control over the manner in which the product builds up in each container as it is conveyed along the filler. It is also to be understood in this regard that, in any arrangement used, the quantity of product discharged from the filler as determined by quantity fed thereto, will effect uniform filling of the containers moved past the filler with a substantially uninterrupted continuous motion.

In the advantageous embodiment of the invention illustrated, the rotor valve is rotated continuously at a predetermined fixed speed, and the rotor valve ports are so arranged in an offset manner along the rotor valve wall that each of these rotor ports crosses transversely over the discharge port with which it is mated to open and close such discharge port in a continuously successive cycle and in such a manner that adjacent discharge port openings and closings are in a successive staggered time relation to each other.

As a result of this arrangement, a stream of product is discharged from one port for a predetermined period of time and from the next adjacent port for a predetermined period of time starting after the starting of the discharge period of the port before, and so on along the row of discharge ports. In other words, the product is discharged from the filler sequentially in separate bodily fixed streams at spaced discharge points along the filler for successive predetermined intermittent periods of time.

In the advantageous embodiment of the present invention, to obtain continuous filling of containers 44, they are moved continuously with a substantially uninterrupted motion in predetermined relationship under the row of discharge ports 4 in the filler casing. Also, the stream discharged from each of the ports is intermittent so that each discharge port is closed at the time when a container mouth is not positioned thereunder. It is immaterial in which direction the container conveyor moves, so long as its motion is in timed relation with the particular type rotor valve which is used to effect the predetermined cycle of intermittent streams at spaced intervals along the length of the filler casing.

Accordingly, any suitable conveyor mechanism can be used to accomplish this result. As illustrated in Figs. 1, 2 and 4 such mechanism comprises an endless conveyor 46 which moves the containers 44 uninterruptedly in the same direction in which the spaced intermittent streams of product occur successively. The conveyor 46 cooperates with means, in the form of worm structure 47, for positioning the containers in predetermined spaced relationship on the conveyor so that the mouths of the containers are under discharge ports of the filler at the time the product is being discharged therefrom. As can best be seen from Fig. 2, worm structure 47 is positioned above conveyor 46 at one side thereof, and comprises a shaft member 48 journalled in bearings 49, and having a worm or helix 51 about the periphery thereof.

The worm 51 does not move the containers 44 but merely spaces them apart in the desired predetermined relationship; the pitch or lead of worm 51 being related to the particular spacing of the rotor ports 25 along the longitudinal axis of the rotor valve so as to avoid product spillage in the spaces between container mouths during filling operation. Conveyor 46 is moved at slightly faster speed than the speed of rotation of worm 51, and as a result, containers 44 are always held against the worm which maintains the containers in proper spaced relationship for proper filling. In this connection, when containers such as open mouth metal cans are employed, instead of glass jars as illustrated, the mouths of these cans need not be spaced apart but can be in contact with each other as is illustrated in Patent 2,667,424. If desired, the containers can travel on a stationary support and worm 51 can be utilized to perform the double function of moving the containers and properly positioning them.

Guide means, including a yieldable guide portion such as that disclosed in Patent No. 2,631,768, can be used in connection with the conveyor to maintain the containers in proper contact with the worm, attention being directed to Figs. 2 and 4 which disclose guide rail 52 in cooperation with the worm. In addition to the guide means, a sensing arm can be provided along the conveyor path, the sensing arm being adapted to sense the absence of a container in the conveyor line and, accordingly cause a valve member in the form of a master shut-valve to cut-off discharge of the filler product from the discharge ports.

In this respect, attention is directed to Figs. 2, 3 and 5 to 7 which disclose such a sensing arm 53 and its relation to a master cylindrical shut-off valve 54 (Figs. 1 and 3) positioned in the filler casing 2 between the cylindrical tubular body part 3 of the casing and the cylindrical rotor valve 23. This shut-off valve 54 is fixed by a bolt 56 to a sleeve 57. The sleeve 57 is adapted to oscillate on the end hub portion 24 of rotor valve 23, a bearing liner 58 being provided between the outer wall of hub 24 and the inner wall of sleeve 56. To permit valve oscillation, a slot 59 (Fig. 5) is provided in the casing, the slot extending transverse the longitudinal axis thereof. A second slot 61 is also provided extending normal to the first slot. This second slot permits rapid assembly and disassembly of the several parts disposed within the tubular body 3 of the filler.

The shut-off valve 54 is provided with passage means which in the instant disclosure is in the form of a plurality of ports 62 which are arranged to coincide in number with the row of discharge ports 4. During normal operation, ports 62 are also in alignment with ports 4, so that a product can pass through ports 4 (Fig. 6). If in operation a container should be missing in the conveyor line, the sensing arm 53, which is of a sufficient length to rest against the sides of two adjacently normally spaced containers, would be spring urged by spring 63 about the sensing arm fulcrum 64 so as to actuate a switch 66. The switch 66, which is connected in circuit 67, would cause solenoid 68 to operate. The shut-off valve being connected to the solenoid 68 by linkage 69 and screw 71, would be actuated and ports 62 disposed therein would move out of alignment with discharge ports 4, causing the discharge ports to be closed (Fig. 7).

It is to be understood that any suitable means can be provided for driving the rotor valve 23 and worm 51 in timed relationship, it again being noted that the conveyor 46 moves at a speed slightly greater than worm 51 to hold the containers against the worm, as aforedescribed. In the advantageous embodiment of the invention and as can more readily be seen in Figs. 1 and 4 of the drawings, the drive is taken off the main drive shaft 42 which carries a sprocket 72. Sprocket 72 is connected by chain 73 to sprocket 74 secured for rotation with worm structure 48. By this arrangement, worm 51 and rotor valve 23 can be simultaneously driven.

A typical operation of one advantageous embodiment of the invention, can be readily understood with reference to the rotor valve development set forth in Fig. 8. According to the schematic representation of this figure, the filler casing has a row of eight equally spaced discharge ports represented by "upper" case letters, A to H. Positioned on the rotor valve, which finds its working equivalent in rotor valve 23 of Fig. 3, are two series of offset rotor ports. Each of these two rotor port series has 8 ports represented by the "upper" case letter designations A' to H' and A'' to H'' respectively. The centrally disposed longitudinal axis Y of each rotor port in each series is equally spaced from the centrally disposed longitudinal axis Y of the next successive rotor port, the spacing being such that the rotor ports of each series mate at some point of rotor movement with discharge ports A to H in accordance with their respective case letter designations.

The centrally disposed horizontal axis X of each port in each series is spaced in 45° relationship about the rotor wall to the centrally disposed horizontal axis X of the next adjacent port so that each rotor port mates with its discharge port in an immediately successive sequence of time upon movement of the rotor. As the rotor is turned, the rotor ports A' and E'' travel in a direction transverse to the row of discharge ports A to H to mate with discharge ports A and E, allowing a product to be discharged from these ports at an overall quantity per unit time equal to the quantity of the product per unit time being fed to the filler casing. During the time ports A and E are open for discharge, the mouths of containers being conveyed below these ports are in proper alignment with them to receive the product being discharged.

As the mouths of the containers move on to a position below ports B and F, the rotor has turned sufficiently to cause rotor ports B' and F'' to start to mate with discharge ports B and F to allow a product to be discharged into the containers from these ports as well as ports A and E. It is to be noted that as ports B and F are opened for discharge, ports A and E start to close, the ports closing shortly before the mouths of the moving containers pass from thereunder and remaining closed until the mouths of succeeding spaced containers on the conveyor come into proper alignment with these ports, thus avoiding spillage of the product. In like manner, as ports B' and F'' pass their discharge ports B and F, ports C' and G'' start to mate with their discharge ports C and G to feed a product to the containers which have advanced to a position therebelow, ports B and F closing before the mouths of the moving containers pass from thereunder.

A like operation is followed throughout the length of the filler casing, the total quantity discharged in each container as it passes under the filler ports being so regulated that the container is substantially completely filled at the end of discharge of the last port H. It will be noted that the respective streams of product discharged from the respective discharge ports 25 are all bodily fixed with reference to the direction of movement of the containers.

From the preceding, it can be seen that the casing 2 having the discharge ports 4 and ported cylindrical rotor valve 23 disposed therein comprise the main elements of the filler unit, the other elements such as the distributor 8, shield 18, and shut-off valve 54 providing an efficacious operating unit.

The described apparatus is adapted for the continuous filling of any pumpable product and can be readily employed with aseptic sealing apparatus like that disclosed in Patent No. 2,549,266, dated April 17, 1951.

As previously mentioned, the size of the rotor, the spacing of the rotor ports, the number of ports and other dimensions of the filler can vary widely in accordance with the size of the containers which are to be filled, their speed of movement and the amount of product per unit of time pumped to the filler. As an example of typical operating conditions, the rotor illustrated in Fig. 8 can be used for filling baby food glass jar containers of size 200 x 309, namely, conventional glass jars 2" in outer diameter and 3 9/16" high, it being noted that these ports can be arranged in space and size so as to include junior food jars of size 208 x 401 as well.

In using a baby food jar of size 200 x 309, the pitch of worm 51 is 3" in order to space the longitudinal central axis of the conveyed jars 3" apart. The distance from the center line of discharge port A to the center line of port H is 6" and, accordingly, 2 jars are filled under the filler unit at the same. Further, these discharge ports A to H each have their center lines spaced from the center line of the next adjacent port a distance of 3/4" and each port measures 1/2" across in diameter. The ports in the rotor, which rotor is approximately 2.8" outer diameter, are so positioned that as one jar is half filled as it passes successively from ports A to D, a second jar which has already been half filled in its passage under discharge ports A to D, is substantially completely filled as it passes successively under discharge ports E to H, the rotor valve ports A' to H' to A" to H", being of proper spacing and breadth dimensions to permit effective mating with the discharge ports A to H. In this connection, the central longitudinal Y axis of each port in the rotor is spaced ¾" from the central longitudinal Y axis of the next adjacent port, each port measuring ½" across along its X axis and stretching for 45° along its Y axis. It should be further noted that the pair of ports in each 45° about the rotor —such as A' and E", B' and F", C' and G" and so on— have their central longitudinal Y axes spaced apart from each other a distance of 3" to agree with the spacing of the jars to be filled and to permit the filling of two jars at one time under the filler. In a filling operation using 200 x 309 size jars, the unit is run at the rate of 100 jars per minute. Therefore the product is pumped to the filler at a rate of approximately 3.9 gallons per minute, since these jars each have a capacity of about 5 ounces.

Finally, it is to be understood that various changes can be made by one skilled in the art in the ararngement, form and construction of the apparatus disclosed and in the several steps of the method disclosed, without departing from the scope or spirit of the invention.

I claim:

1. Apparatus for filling a product in containers comprising a filler including an elongated casing having discharge means disposed longitudinally along the casing, rotary means for supplying the product through said discharge means in a plurality of successure intermittent bodily fixed streams at spaced intervals along the length of said filler, and means for continuously conveying said containers past said filler in timed relation with said rotary supplying means to effect filling of each container in its travel past the filler.

2. Apparatus for filling a product in containers comprising an elongated filler casing having discharge means disposed along the longitudinal axis of said casing, a rotary valve member positioned in said casing and cooperating with said discharge means to supply the product through said discharge means in intermittent streams at spaced intervals, means for continuously conveying said containers past said filler casing in timed relation with said rotary valve member, and a second valve member positioned in said casing adapted to completely shut said discharge means upon failure of said conveying means.

3. Apparatus for filling a product in containers comprising an elongated substantially cylindrical filler casing having a plurality of spaced discharge ports disposed along the longitudinal axis of said casing, a cylindrical rotor valve member rotatably positioned in said casing having a plurality of individual offset ports disposed therein, means for rotating said valve member, the offset ports of said valve member being staggered to register successively with said discharge ports when said valve member is rotated to supply the product through said discharge ports in intermittent streams, and means for continuously conveying said containers along said discharge ports in timed relation with said successive registry of said offset ports with said discharge ports.

4. Apparatus for filling a product in containers comprising an elongated substantially cylindrical filler casing having discharge means disposed along the longitudinal axis of said casing, a first cylindrical valve member rotatably positioned in said casing having passage means disposed therein, means for rotating said valve member so that said passage means in said valve member co-operates with said discharge means of said casing to supply the product through said discharge means in intermittent streams at spaced intervals, means for continuously conveying said containers along said discharge means in timed relation with said rotating valve member, and a second cylindrical valve member oscillatably disposed between said first cylindrical valve member and said filler casing to shut off said discharge means upon failure of said conveying means.

5. Apparatus for filling a product in containers comprising an elongated substantially cylindrical filler casing having a plurality of spaced discharge ports disposed along the longitudinal axis of said casing, a first cylindrical valve member rotatably positioned in said casing having a plurality of offset ports disposed therein, means for rotating said valve member, the offset ports of said valve member being so arranged that when said valve member is rotated said valve ports register successively with said spaced discharge ports to supply the product through said spaced discharge ports in intermittent streams, means for continuously conveying said containers along said discharge ports in timed relation with said first rotating valve member, a second cylindrical valve member positioned between said filler casing and said first valve member, said second valve member having passage means disposed therein to coincide with said discharge ports of said filler casing during normal filling operation, and means for actuating said second valve member to shut off said discharge ports upon failure of said conveying means.

6. Apparatus for filling a product in containers comprising an elongated substantially cylindrical filler casing having a plurality of spaced discharge ports disposed along the longitudinal axis of said casing, means to introduce a product to said casing at a fixed predetermined quantity per unit time, a first cylindrical valve member rotatably positioned in said casing having a plurality of offset ports disposed therein, means for rotating said valve member, the offset ports of said valve member being so arranged that when said valve member is rotated said valve ports register successively with said spaced discharge ports to supply the product through said spaced discharge ports in intermittent streams, means for continuously conveying said containers along said discharge ports in timed relation with said first rotating valve member, a second cylindrical valve member oscillatably positioned between said filler casing and said first valve member, said second valve member having a plurality of spaced ports disposed therein coinciding with said discharge ports of said filler casing during normal operations, actuating means to oscillate said second valve member to shut off said discharge ports, solenoid means to operate said actuating means, and sensing means to energize said solenoid means upon failure of said conveying means.

7. The apparatus of claim 6 said product introducing means including a conduit centrally disposed in said elongated cylindrical filler casing, said conduit having discharge means disposed in its upper part.

8. Apparatus for filling containers with a product, comprising an elongated filler casing having spaced apart discharge ports arranged in a row disposed along its longitudinal axis, rotary valve means for supplying product through said discharge ports, said rotary valve means including a plurality of spaced apart angularly offset valve control elements cooperable with said discharge ports to effect sequential flow of bodily fixed streams at spaced intervals along said filler casing, and means for continuously conveying said containers along the longitudinal axis of said filler casing in timed relation to said rotary valve supplying means to effect uniform filling of each container by supplying said container successively with said intermittent streams in its travel past said filler casing.

9. Apparatus for filling containers with a product, comprising a first elongated casing having product discharge means along its longitudinal axis; a second elongated casing fixedly positioned within said first casing and forming an annular chamber therebetween, said second casing having product discharge means in substantial alignment with the discharge means of said first casing; means for introducing product into said second casing; and an elongated rotary valve having a plurality of individual product discharge ports disposed along its wall and being positioned in said annular chamber between said first and said second casings for effecting the discharge of product from said second casing in a plurality of intermittent streams at spaced intervals.

10. Apparatus for filling containers with a product comprising an elongated filler casing having a plurality of spaced apart product discharge ports arranged in a row extending longitudinally of said casing; means for supplying product into said casing; a valve control structure rotatable relative to said casing about an axis extending longitudinally of said casing, said structure including a plurality of angularly offset parts movable substantially in planes at right angles with respect to and cooperable with the respective discharge ports for effecting sequential flow of said product from said discharge ports in separate bodily fixed streams immovable longitudinally with respect to said casing; and means for continuously conveying said containers longitudinally past said discharge ports in timed relationship with the movement of said valve structure to effect uniform filling of the containers in their travel past said casing.

11. Apparatus for filling containers with a product comprising a cylindrical filler casing having a plurality of spaced apart product discharge ports arranged in a row extending longitudinally of said casing; means for supplying product into said casing; a valve control structure within and rotatable relative to said casing about an axis extending longitudinally of said casing, said structure including a plurality of angularly offset parts movable over the respective discharge ports substantially in planes at right angles with respect to the respective discharge ports to open and close the same in sequential order and effect flow of said product from said discharge ports in separate bodily fixed streams immovable longitudinally with respect to said casing; and means for continuously conveying said containers longitudinally past said discharge ports in timed relationship with the movement of said valve structure to effect uniform filling of the containers in their travel past said casing.

12. A filler comprising a cylindrical casing having a plurality of spaced apart product discharge ports arranged in a row extending longitudinally of said casing, a control valve structure within said casing rotatable about the axis thereof, said control valve structure having a plurality of spaced apart parts for sealing the respective discharge ports during a portion of each revolution of said valve structure, said valve structure having open portions cooperable with the discharge ports of said casing to allow flow of product through the respective discharge ports when they are unsealed, and all of said open portions being angularly offset about the periphery of said valve structure and movable substantially in planes at right angles with respect to the respective discharge ports to open and close the latter in sequential order and effect flow of said product from said discharge ports in separate bodily fixed streams immovable longitudinally with respect to said casing.

References Cited in the file of this patent

UNITED STATES PATENTS

| | | |
|---|---|---|
| 966,564 | Koegler | Aug. 9, 1910 |
| 1,390,383 | Powell | Sept. 13, 1921 |
| 2,324,202 | Felton | July 13, 1943 |
| 2,631,768 | MckMartin et al. | Mar. 17, 1953 |